US009106341B2

(12) United States Patent
Clevorn et al.

(10) Patent No.: US 9,106,341 B2
(45) Date of Patent: Aug. 11, 2015

(54) COMMUNICATION TERMINAL AND METHOD FOR RECEIVING DATA

(75) Inventors: Thorsten Clevorn, Duesseldorf (DE); Bertram Gunzelmann, Koenigsbrunn (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 13/316,650

(22) Filed: Dec. 12, 2011

(65) Prior Publication Data

US 2013/0150104 A1 Jun. 13, 2013

(51) Int. Cl.
*H04M 1/68* (2006.01)
*H04B 17/309* (2015.01)
*H04L 25/02* (2006.01)
*H04W 68/02* (2009.01)
*H04W 24/10* (2009.01)
*H04W 88/06* (2009.01)
*H04L 1/20* (2006.01)
*H04L 1/00* (2006.01)

(52) U.S. Cl.
CPC .......... *H04B 17/309* (2015.01); *H04L 25/0228* (2013.01); *H04W 68/025* (2013.01); *H04L 1/20* (2013.01); *H04L 2001/0092* (2013.01); *H04W 24/10* (2013.01); *H04W 88/06* (2013.01)

(58) Field of Classification Search
CPC .............. H04L 1/20; H04L 2001/0092; H04L 25/0228; H04W 24/10; H04W 658/025; H04W 88/06
USPC .......... 370/203, 208, 252, 260, 329; 455/455, 455/500; 375/347
See application file for complete search history.

(56) References Cited

U.S. PATENT DOCUMENTS

| 6,567,374 | B1* | 5/2003 | Bohnke et al. ............... 370/203 |
| 7,042,968 | B1* | 5/2006 | Jansen et al. ............... 375/347 |
| 2003/0016637 | A1* | 1/2003 | Khayrallah et al. ......... 370/329 |
| 2003/0148770 | A1* | 8/2003 | Das et al. ................... 455/455 |
| 2004/0066754 | A1* | 4/2004 | Hottinen .................... 370/252 |

(Continued)

FOREIGN PATENT DOCUMENTS

CN 102244567 A 11/2011

OTHER PUBLICATIONS

Office action received for Taiwan Patent application No. 101144783, mailed on Jun. 16, 2014, 8 pages of office action and 8 pages of English Translation.

(Continued)

*Primary Examiner* — Wesley Kim
*Assistant Examiner* — Raj Chakraborty (57) ABSTRACT

According to one aspect of this disclosure, a communication terminal is provided comprising a receiver configured to receive pilot information from a first transmitter via a pilot channel; a controller configured to control the receiver to receive, during a predetermined period, pilot information from a second transmitter; and a channel estimator, configured to provide an estimation of transmission characteristics between the communication terminal and the first transmitter for receiving data from the first transmitter over the communication connection during the predetermined period based on other information about the transmission characteristics between the communication terminal and the first transmitter than the pilot information which is sent by the first transmitter via the pilot channel during the predetermined period.

14 Claims, 6 Drawing Sheets

(56) References Cited

U.S. PATENT DOCUMENTS

| | | | |
|---|---|---|---|
| 2005/0147025 A1* | 7/2005 | Auer | 370/203 |
| 2006/0280114 A1* | 12/2006 | Osseiran et al. | 370/208 |
| 2010/0202544 A1* | 8/2010 | Osseirar et al. | 375/260 |
| 2011/0044409 A1 | 2/2011 | Yoshimoto et al. | |
| 2011/0096722 A1* | 4/2011 | Jung | 370/328 |
| 2011/0293050 A1* | 12/2011 | Khoshgard et al. | 375/346 |
| 2012/0014272 A1 | 1/2012 | Zhou et al. | |
| 2012/0264390 A1 | 10/2012 | Clevorn et al. | |
| 2012/0289285 A1 | 11/2012 | Clevorn et al. | |

OTHER PUBLICATIONS

Office action received for Chinese Patent application No. 201210534165,8, issued on Apr. 23, 2015, 9 pages of office action and 15 pages of English Translation.

\* cited by examiner

COMMUNICATION TERMINAL AND METHOD FOR RECEIVING DATA

TECHNICAL FIELD

Aspects of this disclosure generally relate to a communication terminal and method for receiving data.

BACKGROUND

A communication terminal may include more than one subscriber identity module (SIM) to be able to use mobile communication networks of two different operators. The case may occur that information, such as paging information, is to be received from one of the mobile communication networks while the communication terminal is listening to the other mobile communication network. Efficient ways to handle such cases are desirable.

SUMMARY

According to one aspect of this disclosure a communication terminal is provided including a receiver configured to receive pilot information from a first transmitter via a pilot channel to estimate transmission characteristics between the communication terminal and the first transmitter for receiving data from the first transmitter over a communication connection between the communication terminal and the first transmitter; a controller configured to control the receiver to receive, during a predetermined period, pilot information from a second transmitter; and a channel estimator, configured to provide an estimation of the transmission characteristics between the communication terminal and the first transmitter for receiving data from the first transmitter over the communication connection during the predetermined period based on other information about the transmission characteristics between the communication terminal and the first transmitter than the pilot information which is sent by the first transmitter via the pilot channel during the predetermined period.

According to another aspect of this disclosure, a method for receiving data is provided including receiving pilot information from a first transmitter via a pilot channel to estimate transmission characteristics between a communication terminal and the first transmitter for receiving data from the first transmitter over a communication connection between the communication terminal and the first transmitter; controlling the receiver to receive, during a predetermined period, pilot information from a second transmitter; and providing an estimation of the transmission characteristics between the communication terminal and the first transmitter for receiving data from the first transmitter over the communication connection during the predetermined period based on other information about the transmission characteristics between the communication terminal and the first transmitter than the pilot information which is sent by the first transmitter via the pilot channel during the predetermined period.

According to another aspect of this disclosure, a communication terminal is provided including a radio frequency receiver configured to receive, during a predetermined period, data from a first transmitter via a communication channel for transmitting useful data and to receive pilot information from a second transmitter; and a demodulator configured to demodulate the pilot information received from the second transmitter and to demodulate the data received from the first transmitter based on at least one of pilot information received from the first transmitter before the predetermined period and pilot information included in the data received from the first transmitter via the communication channel for transmitting useful data.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of this disclosure are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
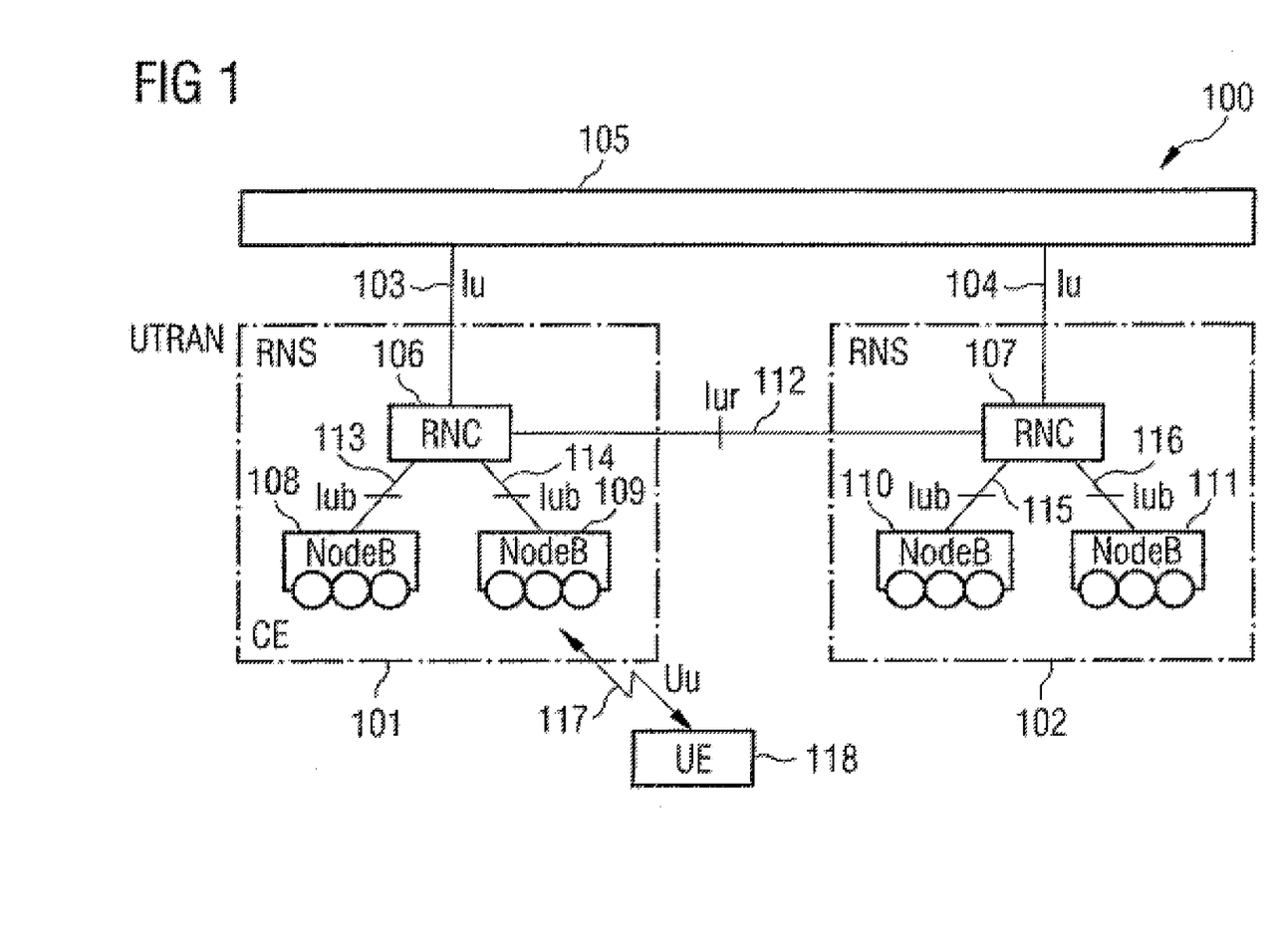
FIG. 1 shows a communication system according to an aspect of this disclosure.

FIG. 1 shows a communication system 100 according to an aspect of this disclosure.

The communication system 100 is a cellular mobile communication system (also referred to as cellular radio communication network in the following) including a radio access network (e.g. an UTRAN, UMTS (Universal Mobile Telecommunications System) Terrestrial Radio Access Network), which has a plurality of mobile radio network subsystems (RNS) 101, 102, which are respectively connected to the UMTS core network (CN) 105 by means of what is known as an Iu interface 103, 104.

A mobile radio network subsystem 101, 102 respectively has a mobile radio network control unit (Radio Network Controller, RNC) 106, 107 and one or more UMTS base stations 108, 109, 110, 111, which are also called NodeB in line with UMTS.

Within the mobile radio access network, the mobile radio network control units 106, 107 of the individual mobile radio network subsystems 101, 102 are connected to one another by means of what is known as an Iur interface 112. Each mobile radio network control unit 106, 107 respectively monitors the allocation of mobile radio resources in all mobile radio cells in a mobile radio network subsystem 101, 102.

A UMTS base station 108, 109, 110, 111 is respectively connected to a mobile radio network control unit 106, 107 associated with the UMTS base station 108, 109, 110, 111 by means of what is known as an Iub interface 113, 114, 115, 116.

Each UMTS base station 108, 109, 110, 111 provides radio coverage for one or more mobile radio cells (CE) within a mobile radio network subsystem 101, 102. Control and user data are transmitted between a respective UMTS base station 108, 109, 110, 111 and a mobile terminal 118 (also referred to as UE, user equipment, e.g. a mobile phone), in a mobile radio cell using an air interface, called Uu air interface 117 in line with UMTS, e.g. on the basis of a multiple access method.

According to one aspect of this disclosure, the mobile terminal 118 may include two SIMs (Subscriber Identity module cards) to be registered in two networks at the same time, e.g. in two mobile communication networks operated by different operators.

In such a scenario, it may desirable that the mobile terminal 118 (in this scenario for example a dual-SIM phone) receives a paging of one of the mobile communication networks while having an active communication connection (e.g. a voice call) via the other mobile communication connection. This feature is also referred to as Dual-SIM-Single-Transport (DSST). This feature may for example be used by the mobile terminal 118 to receive a notification of an incoming call on one of the mobile communication networks, while being in a call on the other mobile communication network. For this feature, for example, the paging sequence of one of the mobile communication networks needs to be received by the mobile terminal 118 while having parallel activity on the other one of the mobile communication networks.

According to one aspect of this disclosure, in accordance with UMTS, a paging sequence consists of the mobile terminal 118 detecting the paging indicator (PI) on the PICH (Paging Indicator Channel) and, in case of a positive paging (i.e. upon detection of its paging indicator on the PICH), the mobile terminal 118 reading the associated PCH (Paging Channel) on a S-CCPCH (Secondary Common Control Physical Channel).

To receive pagings from a mobile communication network while having an active connection on another mobile communication network (as in the conflict scenario described above), a second receive path could be added to the mobile terminal 118. The second receive path would not need to be a full receive path, but could be restricted to the functions necessary to receive a paging. However, for this, usually still additional hardware is required implying e.g. additional chip area and power consumption of the mobile terminal 118.

However, a mobile terminal 118 may include two RF (radio frequency) receivers that allow receiving signals (e.g. up to including conversion to baseband) from two different communication networks (e.g. from base stations of communication networks of two different operators, e.g. operating on different frequency bands). For example, the mobile terminal 118 may have an advanced RF component which supports dual-cell/dual-band HSDPA (High Speed Downlink Packet Access; the mobile terminal 118 may for example support HSDPA without supporting HSUPA, i.e. High Speed Uplink Packet Access). For dual-cell HSDPA no second Rel99 inner receiver (IRX) is required so the requirements for the mobile terminal 118 (e.g. in terms of necessary chip area and/or power consumption) are typically lower than compared to the case of two receive paths as described above.

In this case, for supporting DSST the conflict may occur that a paging signal is received (e.g. the reception of the PICH and PCH/SCCPCH) from one of the mobile communication networks (up to including conversion into baseband) while the inner receiver is demodulating signals related to the ongoing communication connection of the other mobile communication network. However, the resources (e.g. one or more demodulators and/or a despreader) for the processing (e.g. demodulation) of (baseband) paging signals (e.g. the processing of signals transmitted via PICH and/or PCH) are typically not used when processing data received via an ongoing communication connection such as a call. Typically, only the resources for processing pilot signals (i.e. pilot or channel estimation), for example received via the CPICH (Common Pilot Indicator Channel) according to UMTS, and the dedicated data signal, for example the DPCH in UMTS, are occupied for the reception of data via the communication connection. According to one aspect of this disclosure, DSST is supported in such a scenario. It should be noted that in this disclosure "receiving" and "reception" may be understood to include the whole process of reception via one or more antennas, conversion into baseband, demodulation, despreading and possibly further reception processing. However, as will be apparent from the context, "receiving" and "reception" may also only refer to a part of the complete reception processing, such as the reception via one or more antennas up to conversion into baseband.

Figure 2:
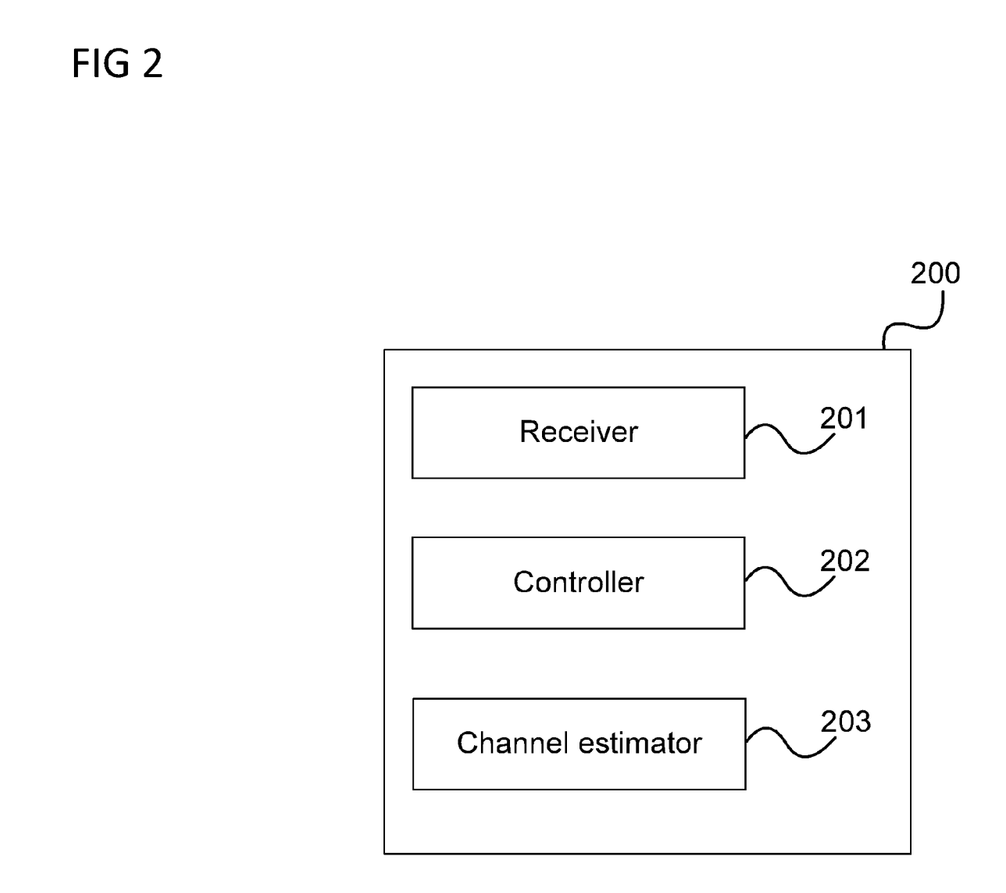
FIG. 2 shows a communication terminal according to an aspect of this disclosure.

FIG. 2 shows a communication terminal 200 according to an aspect of this disclosure.

The communication terminal 200 includes a receiver 201 configured to receive pilot information from a first transmitter via a pilot channel to estimate transmission characteristics between the communication terminal and the first transmitter for receiving data from the first transmitter over a communication connection between the communication terminal and the first transmitter.

The communication terminal 200 further includes a controller 202 configured to control the receiver to receive, during a predetermined period, pilot information from a second transmitter.

Additionally, the communication terminal 200 includes a channel estimator 203, configured to provide an estimation of the transmission characteristics between the communication terminal and the first transmitter for receiving data from the first transmitter over the communication connection during the predetermined period based on other information about the transmission characteristics between the communication terminal and the first transmitter than the pilot information which is sent by the first transmitter via the pilot channel during the predetermined period.

According to one aspect of this disclosure, in other words, a communication terminal listens to the pilot symbols transmitted by a first base station to which it has a communication connection for the channel estimation to be used for receiving data via the communication connection. To receive data from a second base station (e.g. to receive pagings), the communication terminal may switch (e.g. at the known paging transmission timings) to the reception of the pilot symbols transmitted from the second base station, e.g. switch the signals to be forwarded to its inner receiver for processing (e.g. demodulation/dispreading) from pilot signals received from the first base station to pilot signals received from the second base station.

The communication terminal may have two RF receivers that allow the communication terminal to receive signals from the first base station and the second base station simultaneously (e.g. up to including conversion into baseband) but, according to one aspect of this disclosure, only has one inner receiver component to process pilot information such that only pilot information from the first base station or pilot information from the second base station may be processed at a time. For being able to receive both data transmitted via the communication connection and information from the second base station (e.g. paging information), the pilot symbols received from the second base station are processed for the reception of information from the second base station during a predetermined period (e.g. a scheduled reception period for the reception of the information from the second base station, e.g. a paging timing) while the channel estimates for the reception of data received from the first base station are determined based on another source than the pilot information sent from the first base station during this period.

According to one aspect of this disclosure, the receiver 201 includes a radio frequency receiver (which for example includes the reception processing up to and including the conversion of the received radio signal into baseband) and an inner receiver (e.g. including a demodulator) carrying out the demodulation. For example, the demodulation is carried out using the estimated transmission characteristics (also referred to as channel estimates).

According to one aspect of this disclosure, the controller is configured to control the receiver to receive the pilot information from the second transmitter during the predetermined period instead of receiving the pilot information from the first transmitter.

According to one aspect of this disclosure, the channel estimator is configured to provide the estimation of the transmission characteristics between the communication terminal and the first transmitter for receiving data from the first transmitter over the communication connection during the predetermined period without using the pilot information which is sent by the first transmitter during the predetermined period via the pilot channel.

According to one aspect of this disclosure, the other information is information about the transmission characteristics between the communication terminal and the first transmitter based on pilot information received from the first transmitter before the predetermined period.

According to one aspect of this disclosure, the other information is information included in data transmitted via the communication connection.

For example, the other information is information included in data transmitted via the communication connection during the predetermined period.

For example, the other information is pilot information included in the data transmitted via the communication connection.

The data transmitted via the communication connection may for example be data transmitted via a communication channel of the communication connection. The communication connection is for example a communication connection for communicating useful data between the communication terminal and the first transmitter, e.g. a dedicated communication connection.

For example, the communication channel of the communication connection is a dedicated physical channel used for the communication connection.

The communication channel of the communication connection is for example different from the pilot channel.

According to one aspect of this disclosure, the other information includes information about the transmission characteristics between the communication terminal and the first transmitter based on pilot information received from the first transmitter before the predetermined period and information included in the data transmitted via the communication connection.

The channel estimator is for example configured to provide the estimation of the transmission characteristics between the communication terminal and the first transmitter for receiving data from the first transmitter over the communication connection during the predetermined period by combining the information about the transmission characteristics between the communication terminal and the first transmitter based on pilot information received from the first transmitter before the predetermined period and the information included in the data transmitted via the communication connection.

According to one aspect of this disclosure, the pilot channel is a common pilot indicator channel.

According to one aspect of this disclosure, the pilot channel is a pilot channel of the first transmitter.

According to one aspect of this disclosure, the controller is configured to control the receiver to receive pilot information from the second transmitter via a pilot channel of the second transmitter during the predetermined period.

According to one aspect of this disclosure, the receiver supports receiving data from the first transmitter and the second transmitter simultaneously.

According to one aspect of this disclosure, the receiver supports demodulating only one of the pilot information of the first transmitter or the pilot information of the second transmitter at a time. For example, the receiver may only have one demodulator for a pilot channel. This means that while the receiver may be capable of receiving data from the first transmitter and the second transmitter simultaneously (including demodulation of both data) this may only be possible if only one of the data are transmitted via a pilot channel and the other data are, for example, data transmitted via a dedicated physical channel.

The controller may be configured to control the receiver to demodulate, during the predetermined period, the pilot information received from the second transmitter.

The controller may for example be configured to control the receiver to demodulate, during a period preceding the predetermined period and during a period following the predetermined period, the pilot information received from the first transmitter.

According to one aspect of this disclosure, the length of the period preceding the predetermined period and the length of the period following the predetermined period are both larger than the length of the predetermined period.

For example, the length of the period preceding the predetermined period and the length of the period following the predetermined period are both a multiple of the length of the predetermined period.

According to one aspect of this disclosure, at least one of the first transmitter and the second transmitter is a base station.

For example, the first transmitter is a base station of a first mobile communication network and the second transmitter is a base station of a second mobile communication network.

According to one aspect of this disclosure, the communication terminal includes a first subscriber identity module allowing communication via the first mobile communication network and a second subscriber identity module allowing communication via the second mobile communication network.

According to one aspect of this disclosure, wherein the communication terminal is a mobile communication terminal.

According to one aspect of this disclosure, the controller is configured to control the receiver to receive, in addition to the pilot information of the second transmitter, additional data from the second transmitter.

According to one aspect of this disclosure, the receiver is configured to receive the additional data using the pilot information received from the second transmitter.

According to one aspect of this disclosure, the additional data are paging information of the second transmitter.

According to one aspect of this disclosure, the receiver is configured to receive data from the first transmitter via the communication connection using the estimation of the transmission characteristics provided by the channel estimator.

According to one aspect of this disclosure, the first transmitter and the second transmitter operate at different radio frequencies.

Figure 3:
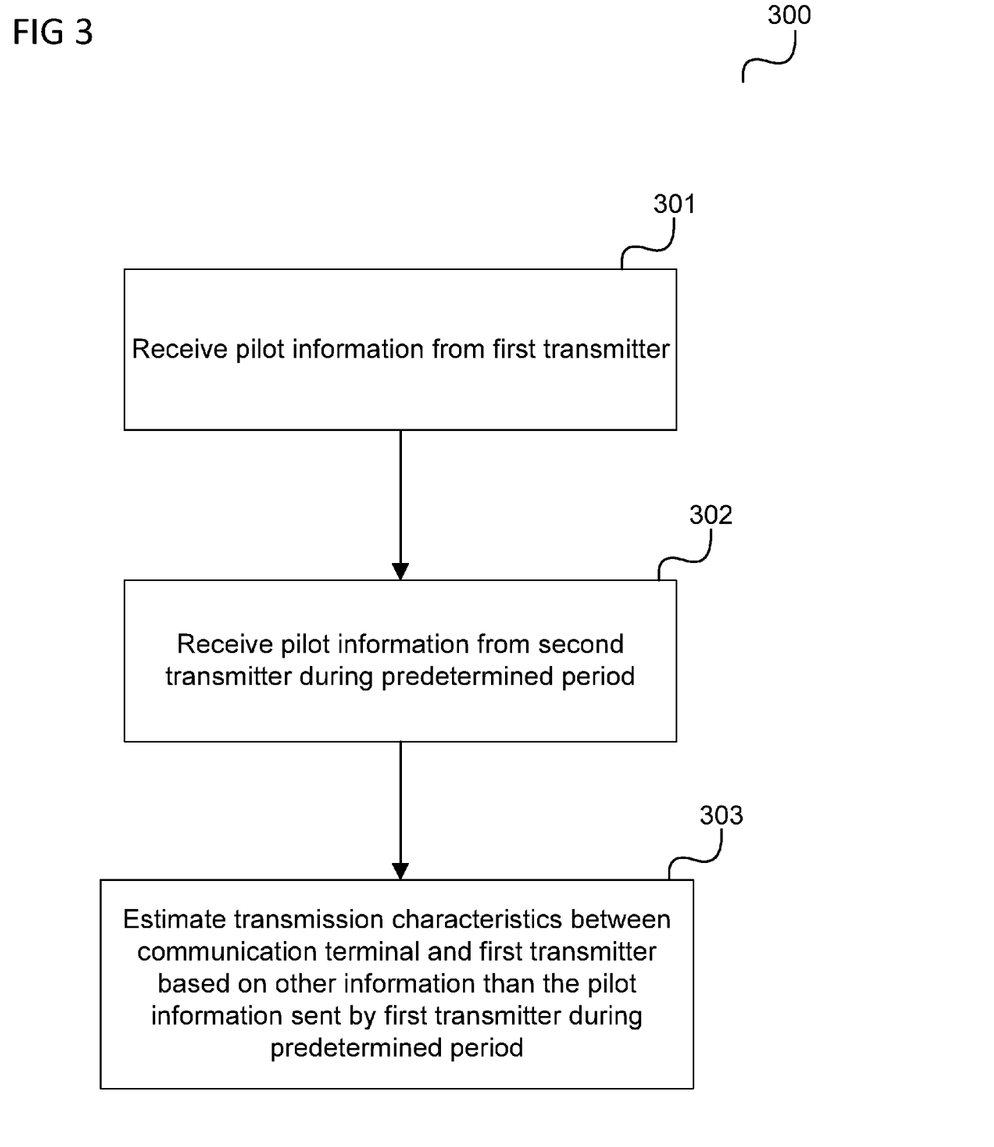
FIG. 3 shows a flow diagram according to an aspect of this disclosure.

The communication terminal 200 for example carries out a method as illustrated in FIG. 3.

FIG. 3 shows a flow diagram 300 according to an aspect of this disclosure.

The flow diagram 300 illustrates a method for receiving data.

In 301, pilot information is received from a first transmitter via a pilot channel to estimate transmission characteristics between a communication terminal and the first transmitter for receiving data from the first transmitter over a communication connection between the communication terminal and the first transmitter.

In 302, the receiver is controlled to receive, during a predetermined period, pilot information from a second transmitter.

In 303, an estimation of the transmission characteristics between the communication terminal and the first transmitter for receiving data from the first transmitter over the communication connection during the predetermined period is provided based on other information about the transmission characteristics between the communication terminal and the first transmitter than the pilot information which is sent by the first transmitter via the pilot channel during the predetermined period.

It should be noted that embodiments described in context with the communication terminal are analogously valid for the method for receiving data and vice versa.

Aspects of this disclosure are described in the following in more detail.

Figure 4:
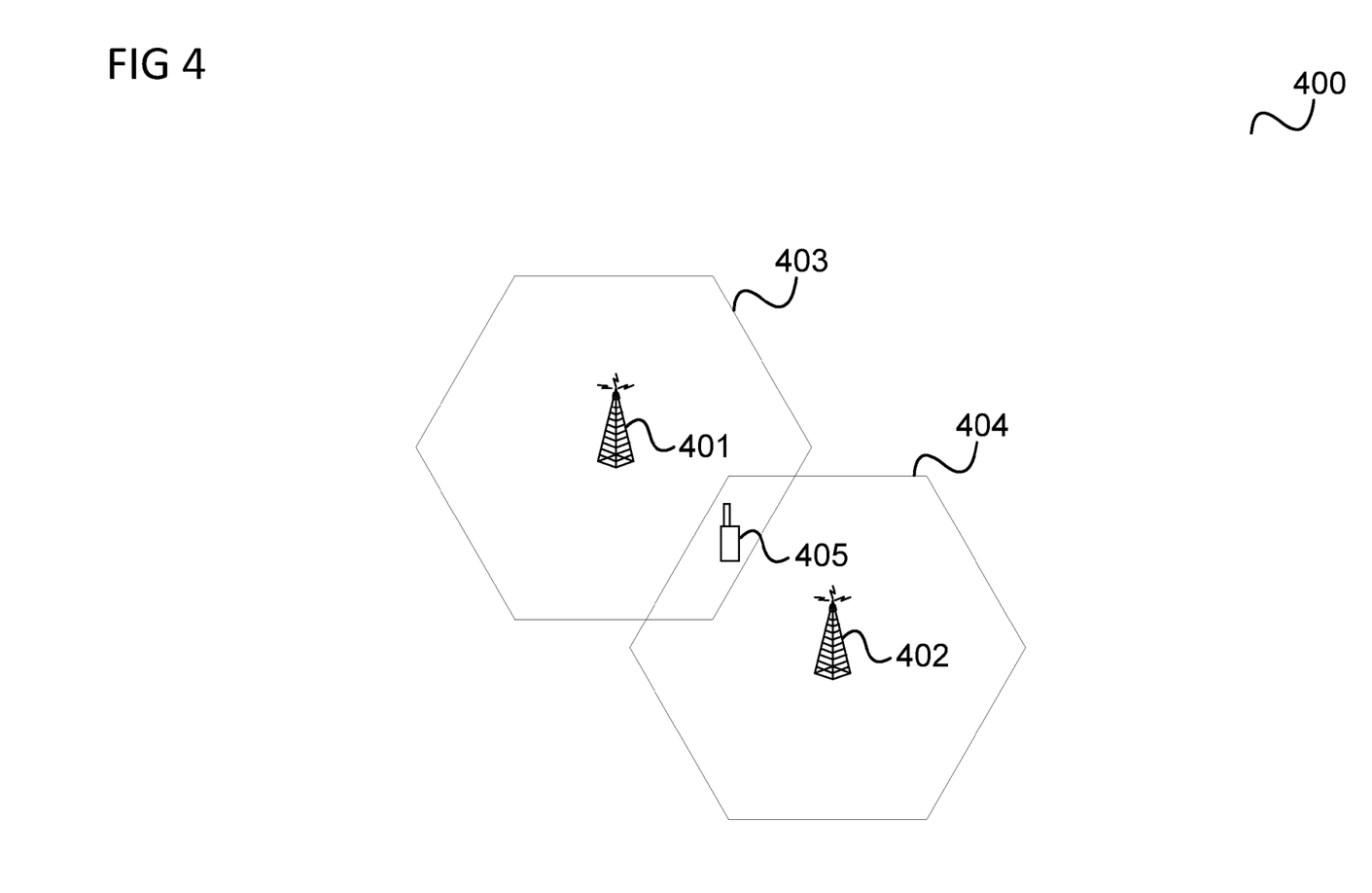
FIG. 4 shows a communication arrangement according to an aspect of this disclosure.

FIG. 4 shows a communication arrangement 400 according to an aspect of this disclosure.

The communication arrangement includes a first base station 401 operating a first radio cell 403 and a second base station 402 operating a second radio cell 404. The first base station 401 is assumed to be part of a first mobile communication network and the second base station 402 is assumed to be part of a second mobile communication network. For example, the first base station 401 corresponds to one of the base stations 108 to 111 of the mobile communication network of FIG. 1 and the second base station 402 corresponds to a base station of another mobile communication network, e.g. having a similar structure as the mobile communication network of FIG. 1 but for example being operated by a different operator.

A communication terminal 404, for example corresponding to the mobile terminal 118, is located in first radio cell 403 and the second radio cell 404 which are assumed to overlap in this example. The communication terminal 404 is assumed to have a SIM (Subscriber Identity Module) or a USIM (Universal Subscriber Identity Module) for each of the mobile communication networks.

The mobile terminal 404 is assumed to have two RF receivers but only one inner receiver component to process (e.g. demodulate) received pilot signals (e.g. baseband pilot signals) at a time. This is illustrated in FIG. 5.

Figure 5:
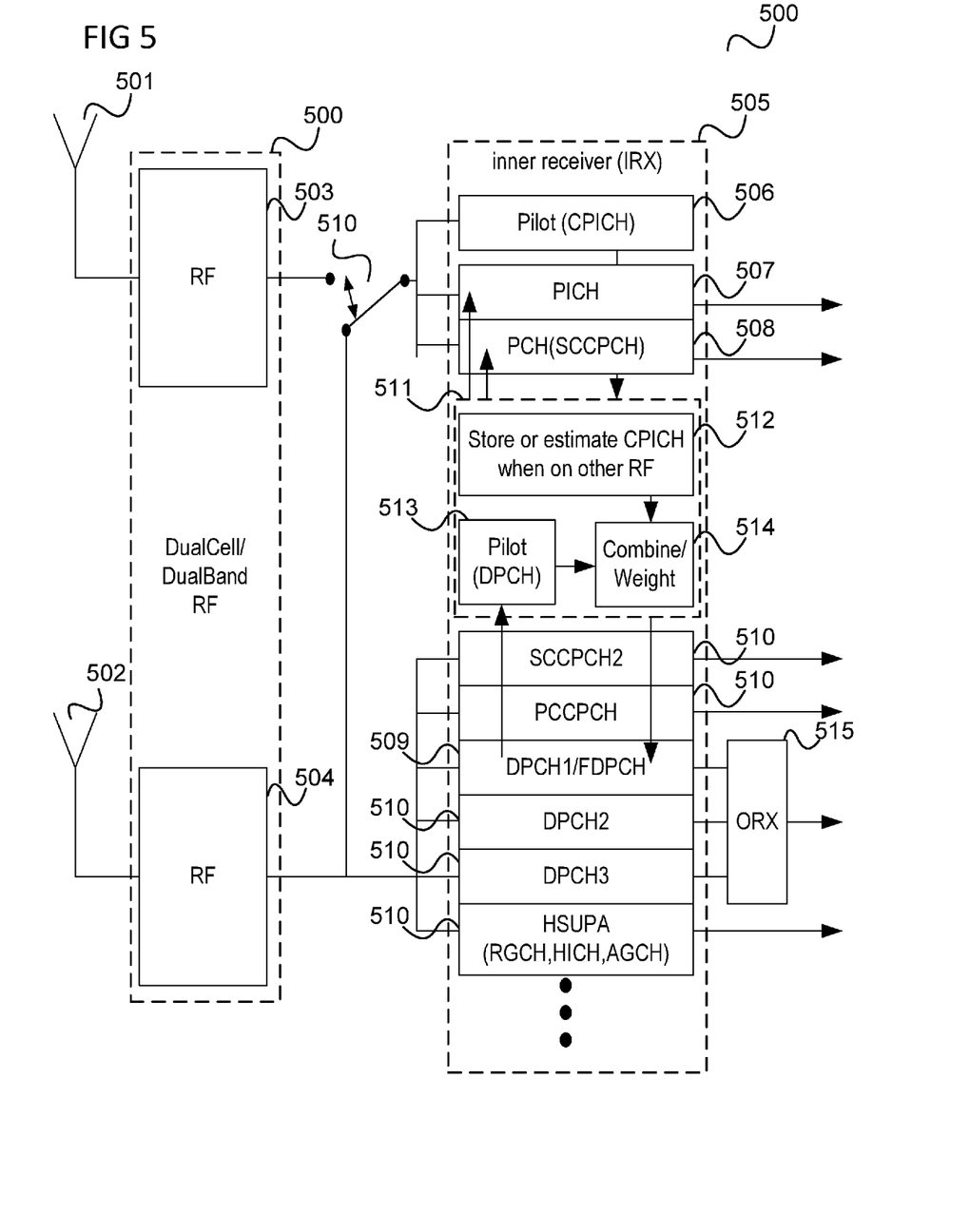
FIG. 5 shows a communication terminal according to an aspect of this disclosure.

FIG. 5 shows a communication terminal 500 according to an aspect of this disclosure.

The communication terminal 500 includes a first antenna 501, a first RF (radio frequency) receiver 503, a second antenna 502 and a second RF receiver 504. Signals received by the first antenna 501 are filtered and converted into baseband by the first RF receiver 503. Signals received by the second antenna 502 are filtered and converted into baseband by the second RF receiver 504. The first RF receiver 503 and the second RF receiver 504 may be part of a Dual Cell (or Dual Band) RF receiver 520.

The communication terminal 500 includes an inner receiver 505 (e.g. a Rel99 receiver, i.e. a receiver according to UMTS Release 99). The inner receiver 505 includes reception processing components (e.g. demodulators) 506, 507, 508, 509, 510 for various channels (e.g. PICH, DPCH (dedicated physical channel), . . . ) which may for example perform the despreading of received signals for the various channels. Particularly, the inner receiver 505 includes a CPICH demodulator 506, a PICH demodulator 507, a PCH demodulator (i.e. a SCCPCH demodulator) 508 and a DPCH (or FDPCH, i.e. fractional dedicated physical channel) demodulator 509.

It is assumed that the communication terminal 405 has an established communication connection via a dedicated physical channel between the communication terminal 405 and the first base station 401 (e.g. a voice call) and the second RF receiver 504 is used to receive data received via the communication connection and forwards the data to the DPCH demodulator 509. The DPCH demodulator 509 demodulates the data and forwards the demodulated data to an outer receiver 515 which performs further processing of the demodulated data such as channel decoding. The second RF receiver 504 is further used to receive pilot information from the first base station 401.

It is further assumed that the first receiver 503 is used to receive paging information (i.e. information transmitted via the PICH or the PCH) from the second base station 402 and to receive pilot information from the second base station 402.

The inner receiver 505 further includes a channel estimator 511.

When the communication terminal 500 does not listen to the PICH and PCH of the second base station 402, the pilot information received from the first base station 401 is forwarded to the CPICH demodulator which demodulates the pilot information and forwards the demodulated pilot information to the channel estimator 511. The channel estimator 511 estimates channel characteristics (i.e. transmission characteristics) of the dedicated physical channel used for the communication connection and supplies the DPCH demodulator 509 with these channel estimates. The DPCH demodulator 509 uses these channel estimates for the demodulation of the data received via the communication connection (i.e. received via the dedicated physical channel used for the communication connection).

However, when the communication terminal 500 listens to the PICH and PCH of the second base station 402 (e.g. at one or more predetermined periods given by the paging timing), the CPICH demodulator 506 is not supplied with the pilot information received from the first base station 401 but with the pilot information received from the second base station 402. This is illustrated by a switch 516 which is switched from the second RF receiver 504 to the first RF receiver 503 for these periods. In this case, the CPICH demodulator 506 demodulates the pilot information received from the second base station 402 and supplies the channel estimator with the demodulated pilot information. The channel estimator 511 estimates channel characteristics (i.e. transmission characteristics) of the PICH and/or the PCH between the communication terminal 405 and the second base station 402 and supplies the PICH demodulator 507 and/or the PCH demodulator 508 with these channel estimates. The PICH demodulator 507 and the PCH demodulator 508 use these channel estimates to demodulate the received paging information.

During the times when the pilot information received from the second base station 402 is forwarded to the CPICH demodulator 506, pilot information received from the first base station 501 is not demodulated.

According to one aspect of this disclosure, the channel estimator stores the decoded pilot information received from the first base station 401 (or stores the channel estimates generated from this decoded pilot information) to use it for a period in which pilot information from the first base station 401 is not demodulated. For example, when the transmission characteristics of the dedicated physical channel used for the communication connection can be expected to change slowly, e.g. when the communication terminal 404 only moves slowly or not at all, the last stored channel estimates or decoded pilot information may be used for the demodulation of the data received via the DPCH for the short period of PICH (and potential PCH) reading on the second mobile communication network, during which the CPICH demodulator 506 is used for the pilot information of the second base station 502.

According to another aspect of this disclosure, the pilot information or the channel estimates for the first mobile communication network are estimated/extrapolated for the short period for the short period of PICH (and potential PCH) reading on the second mobile communication network, for example based on the previous pilot information or channel estimates stored. This may typically result in a degradation of channel estimation quality of the dedicated physical channel used for the communication connection, but with the short time necessary for receiving the paging information from the second mobile communication network and a slow variation in transmission characteristics the impact will be small.

The storage of decoded pilot information or channel estimates and the extrapolation (estimation) of pilot information or channel estimates based on previous information is illustrated by block 512 of the channel estimator 511.

According to another aspect of this disclosure, DPCH pilot symbols may be used for the channel estimation of the dedicated physical channel used for the communication connection during the periods in which the pilot information of the second base station is demodulated by the CPICH demodulator 506. According to UMTS, besides useful data also some pilot symbols are transmitted which can be supplied to the channel estimator 511 by the DPCH demodulator 509 and can be used by the channel estimator 511 for the channel estimation. This is illustrated by block 513 of the channel estimator 511. It should be noted that the number of pilot symbols transmitted via the DPCH is usually smaller than the number of pilot symbols transmitted via the CPICH. Thus, it may normally be better to use the CPICH pilot symbols for the channel estimation.

According to another aspect of this disclosure, a (possibly weighted) combination of DPCH pilot symbols and stored/extrapolated CPICH pilot symbols (or stored/extrapolated channel estimates) are used for the channel estimation of the dedicated physical channel used for the communication connection during the periods in which the pilot information of the second base station is demodulated by the CPICH demodulator 506. This is illustrated by block 514 of the channel estimator 511.

It should be noted that when using a DualCell/Dual Band RF receiver 511 the first radio cell 503 may operate on a different frequency than the second radio cell 504. In theory, both the first RF receiver 503 and the second RF receiver 504 could be tuned to the same frequency. In this case, however, a single RF receiver could be used.

In the following, an alternative to the storing and/or estimation/extrapolation of pilot information and/or channel estimates for supporting DSST is described.

In case that there is a long DRX (discontinuous transmission) paging cycle on the second mobile communication network it may be possible to skip packets received from the first base station 401 which overlap with the PICH (or potentially the PCH) transmission of the second base station 402 with only a small loss of the quality of the reception on the first mobile communication network. According to UMTS, a PICH transmission is shorter than a 10 ms frame. Thus, skipping a PICH transmission basically results in a loss of a 10 ms frame transmitted by the first base station 401 every DRX cycle (e.g. every 2 or 5 seconds) of the second mobile communication network. This is typically hardly noticeable by the end user and can with high probability be compensated by error concealment for voice traffic and retransmissions for data traffic. These mechanisms are typically needed anyway since a certain error rate typically needs to be tolerated. The mobile terminal 404 may also improve the reception quality to avoid additional errors besides the intentionally dropped frames by requesting more power from the first mobile communication network via the outer loop power control.

This approach for supporting DSST requires no change to the baseband receiver. The operation can be seen to be similar to compressed mode for inter frequency measurement with a very large distance between the compressed mode gaps only that in the gaps paging information is received from another mobile communication network instead of doing measurements and that on the primary mobile communication network the compressed mode is not considered by the base station but a packet is lost.

Figure 6:
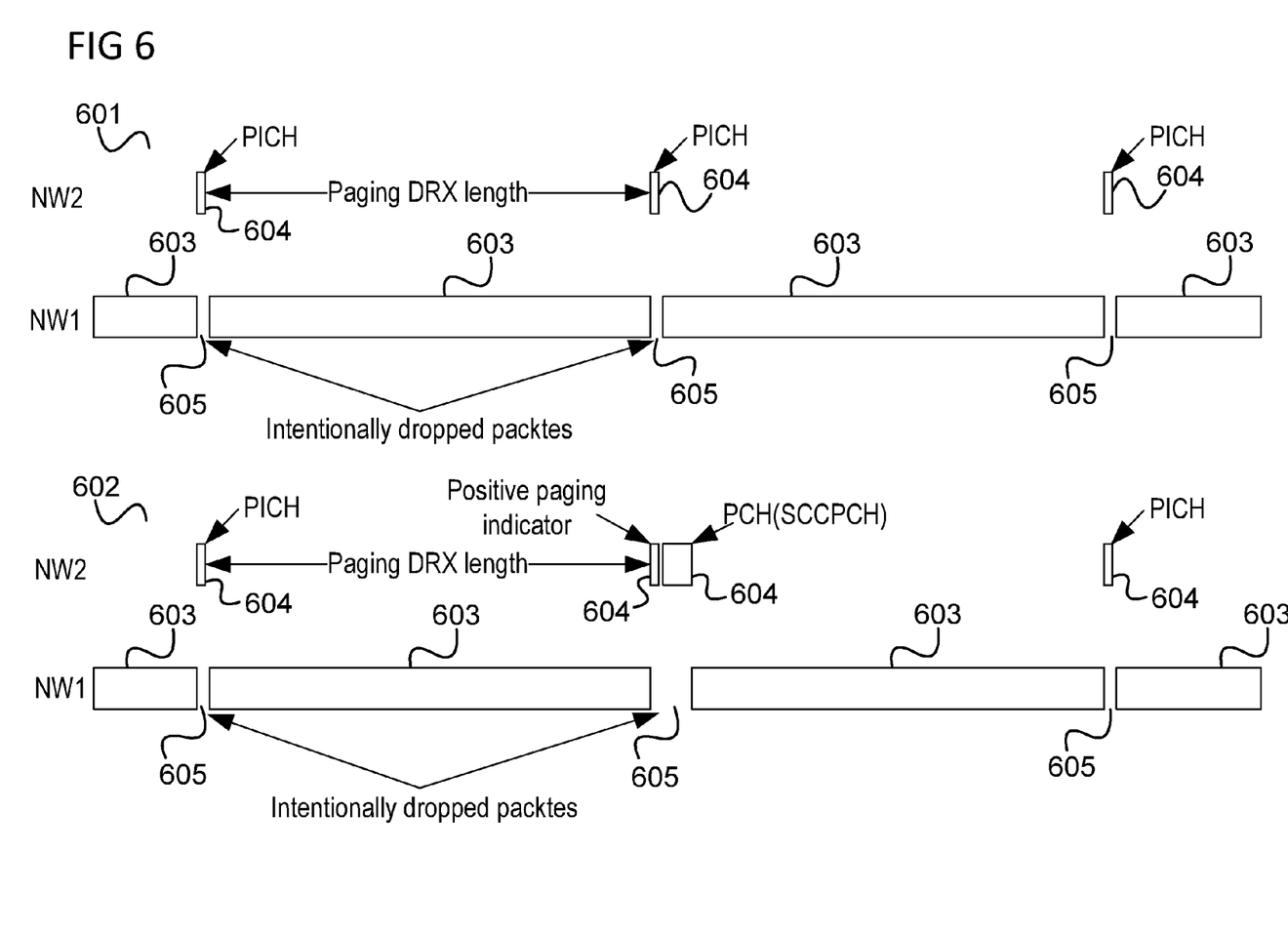
FIG. 6 shows a first transmission diagram and a second transmission diagram.

This approach for supporting DSST is illustrated in FIG. 6.

FIG. 6 shows a first transmission diagram 601 and a second transmission diagram 602.

The first transmission diagram 601 illustrates the reception of data 603 transmitted by the first communication network (bottom) and the reception of paging information 604 transmitted by the second communication network (top) in the case that no positive paging indicator is received.

The second transmission diagram 602 illustrates the reception of data 603 transmitted by the first communication network (bottom) and the reception of paging information 604 transmitted by the second communication network (top) in the case a positive paging indicator is received.

At times 605, packets of the data 603 transmitted by the first base station 401 are intentionally dropped for allowing listening to the PICH of the second mobile communication network and, as illustrated in the second transmission diagram 602, to the PCH (i.e. an SCCPCH) in case of the reception of a positive paging indicator.

The second radio cell 404 may operate on a different frequency than the first radio cell 403 resulting in short switching gaps in the RF receiver. In case that the second radio cell 404 (and accordingly the SIM for the second mobile communication network) operates on the same frequency as the first radio cell 403 (i.e. both SIMs for example belong to the same mobile communication network, i.e. the first mobile communication network and the second mobile communication network are the same mobile communication network) the RF receiver would not need to be switched. Thus, a normal parallel reception would be possible (unless the PCH/SCCPCH conflicts with another SCCPCH, for example).

It should be noted that the various approaches for supporting DSST may be combined according to an aspect of this disclosure.

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. Communication terminal comprising
a first antenna configured to receive signals from a first transmitter,
a first RF receiver configured to filter and convert signals into baseband received by the first antenna;
a second antenna configured to receive signals from a second transmitter,
a second RF receiver configured to filter and convert signals received by the second antenna into baseband;
a receiver component coupled to the first RF receiver and the second RF receiver, the receiver component configured to receive from the first RF receiver data at least from the first transmitter via a communication connection over a dedicated physical channel and further configured to simultaneously receive from the first RF receiver first pilot information via a pilot channel from the first transmitter and to receive from the second RF receiver second pilot information via the pilot channel from the second transmitter, the pilot channel being different from the dedicated physical channel;
wherein the receiver component further comprises a pilot channel demodulator configured to demodulate either the first pilot information or the second pilot information, the pilot channel demodulator coupled to either the first antenna or the second antenna via a switch,
a controller configured to control the receiver component to either demodulate the first pilot information received via the pilot channel from the first transmitter or demodulate the second pilot information received from the second transmitter via the pilot channel by selectively controlling the switch; and
a channel estimator, configured, before and after a predetermined period to provide an estimation of the transmission characteristics of the communication connection between the communication terminal and the first transmitter for receiving data from the first transmitter over the dedicated physical channel based on demodulation of the first pilot information received from the first transmitter via the pilot channel, wherein the pilot channel demodulator is coupled to the first antenna via the switch before and after predetermined period,
wherein during the predetermined period, the communication connection over the dedicated physical connection is maintained with data continued to be received from the first transmitter and the controller is further configured to cause demodulation of the second pilot information instead demodulating the first pilot information by causing the switch to couple the pilot channel demodulator to the second RF receiver instead of the first RF receiver; and
wherein during the predetermined period, the channel estimator is further configured to estimate the transmission characteristics of the communication connection over the physical dedicated channel between the communication terminal and the first transmitter based on other information and without the first pilot information sent by the first transmitter via the pilot channel during the predetermined period, wherein the other information comprises the pilot information received from the first transmitter before the predetermined period and information from the data transmitted from the first transmitter over the dedicated communication channel during the predetermined period.

2. The communication terminal according to claim 1, wherein the other information comprises information about the transmission characteristics between the communication terminal and the first transmitter based on the first pilot information received from the first transmitter before the predetermined period.

3. The communication terminal according to claim 1, wherein the other information comprises information included in data transmitted via the communication connection.

4. The communication terminal according to claim 3, wherein the other information comprises information included in data transmitted via the communication connection during the predetermined period.

5. The communication terminal according to claim 4, wherein the other information comprises pilot information included in the data transmitted via the communication connection.

6. The communication terminal according to claim 1, wherein the channel estimator is configured to provide the estimation of the transmission characteristics between the communication terminal and the first transmitter for receiving data from the first transmitter over the communication connection during the predetermined period by combining the information about the transmission characteristics between the communication terminal and the first transmitter based on the first pilot information received from the first transmitter before the predetermined period and the information included in the data transmitted via the communication connection.

7. The communication terminal according to claim 1, wherein the pilot channel is a common pilot indicator channel.

8. The communication terminal according to claim 1, wherein the pilot channel is a pilot channel of the first transmitter.

9. The communication terminal according to claim 1, wherein the controller is configured to control the receiver to receive the second pilot information from the second transmitter via a pilot channel of the second transmitter during the predetermined period.

10. The communication terminal according to claim 1, wherein the length of the period preceding the predetermined period and the length of the period following the predetermined period are both larger than the length of the predetermined period.

11. The communication terminal according to claim 10, wherein the length of the period preceding the predetermined period and the length of the period following the predetermined period are both a multiple of the length of the predetermined period.

12. The communication terminal according to claim 1, wherein at least one of the first transmitter and the second transmitter is a base station.

13. The communication terminal according to claim 12, wherein the first transmitter is a base station of a first mobile communication network and the second transmitter is a base station of a second mobile communication network.

14. Method for receiving data comprising
receiving from a first RF receiver first pilot information from a first transmitter; and receiving from a second RF receiver second pilot information from a second transmitter simultaneously via a pilot channel;
receiving from the first RF receiver data from the first transmitter via a communication connection between the communication terminal and the first transmitter over a dedicated physical channel, the dedicated physical channel being different from the pilot channel;
controlling the receiver to demodulate, by a pilot channel demodulator, the first pilot information from the first transmitter received from the first RF receiver via the pilot channel before and after a predetermined period by coupling the pilot channel demodulator to the first RF receiver,
wherein during the predetermined period, the communication connection over the dedicated physical connection is maintained with data continued to be received from the first transmitter and the pilot channel demodulator of the receiver is controlled to demodulate the second pilot information received from the second transmitter received from the second RF transceiver via the pilot channel during the predetermined period instead of demodulating the first pilot information received from the first transmitter received from the first RF receiver via the pilot channel by causing the the pilot channel demodulator to couple to the second RF receiver; and
providing an estimation of the transmission characteristics of the communication connection between the communication terminal and the first transmitter for receiving data over the dedicated physical channel from the first transmitter based on the first pilot information sent by the first transmitter via the pilot channel,
wherein during the predetermined period, providing an estimation of the transmission characteristics of the communication connection between the communication terminal and the first transmitter for receiving data over the dedicated physical channel from the first transmitter without the first pilot information sent by the first transmitter via the pilot channel during the predetermined period, and based on other information comprising the pilot information received from the first transmitter before the predetermined period and information from the data transmitted from the first transmitter over the dedicated communication channel during the predetermined period.

* * * * *

UNITED STATES PATENT AND TRADEMARK OFFICE
CERTIFICATE OF CORRECTION

| | |
|---|---|
| PATENT NO. | : 9,106,341 B2 |
| APPLICATION NO. | : 13/316650 |
| DATED | : August 11, 2015 |
| INVENTOR(S) | : Thorsten Clevorn et al. |

It is certified that error appears in the above-identified patent and that said Letters Patent is hereby corrected as shown below:

In the Claims:

Claim 14 - Column 14, line 3 delete "by causing the the pilot channel" and insert --by causing the pilot channel-- in place thereof.

Signed and Sealed this
Twenty-third Day of August, 2016

Michelle K. Lee
*Director of the United States Patent and Trademark Office*